INVENTORS.
Ronald B. Wiley
Robert G. Russell
BY Staelin & Overman
Attorneys.

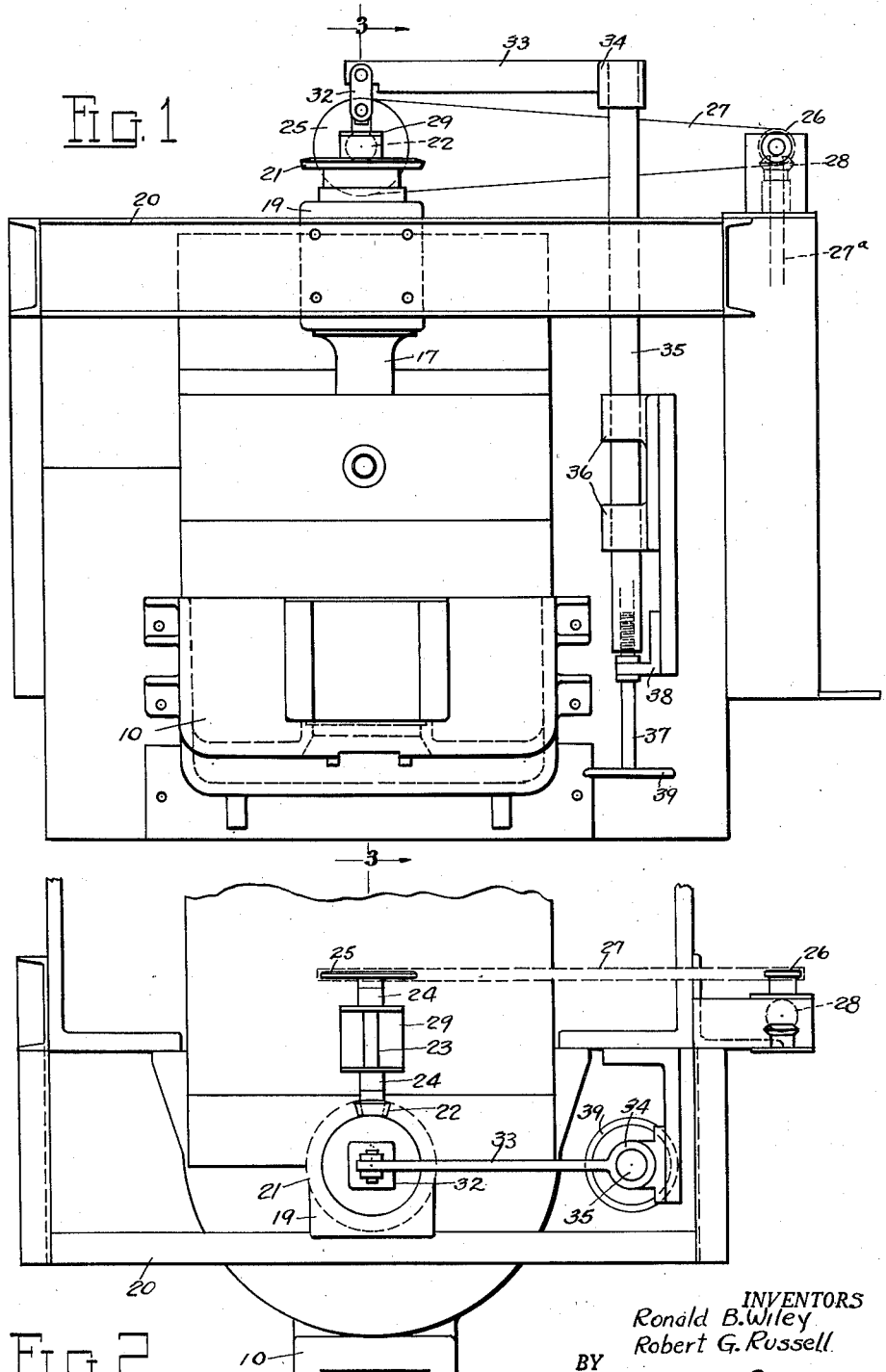
July 18, 1950     R. B. WILEY ET AL     2,515,481
METHOD OF AND APPARATUS FOR MIXING MOLTEN GLASS
Filed Oct. 11, 1944     3 Sheets-Sheet 1
INVENTORS
Ronald B. Wiley
Robert G. Russell
BY
Attorneys.

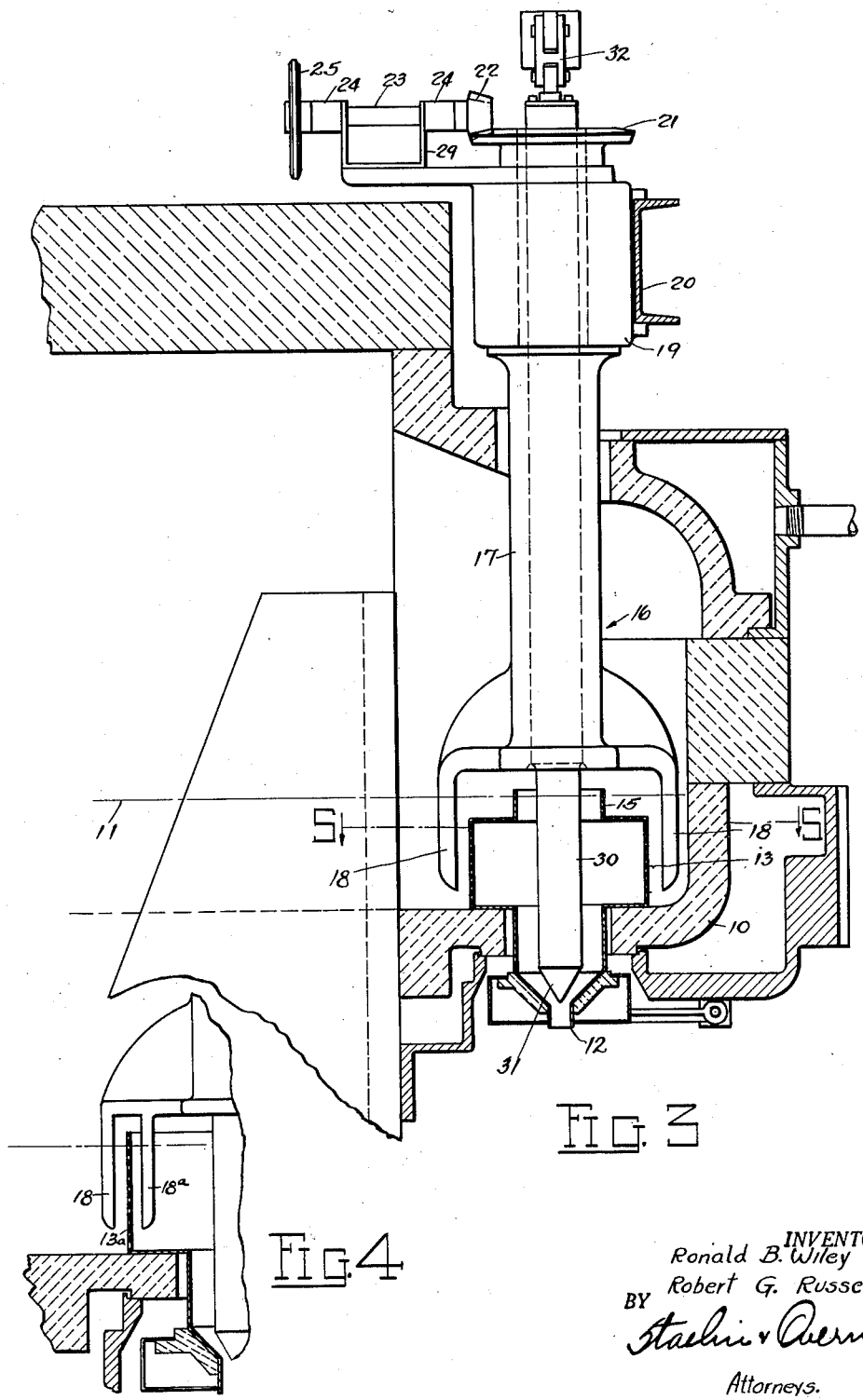

Patented July 18, 1950

2,515,481

UNITED STATES PATENT OFFICE

2,515,481

METHOD OF AND APPARATUS FOR MIXING MOLTEN GLASS

Ronald B. Wiley and Robert G. Russell, Newark, Ohio, assignors to Owens-Corning Fiberglas Corporation, Toledo, Ohio, a corporation of Delaware Application October 11, 1944, Serial No. 558,218

7 Claims. (Cl. 49—55)

This invention relates to an improved method and apparatus for mixing molten glass.

The principal object of this invention is to increase the homogeneity of molten glass and thereby contribute materially to supplying a higher quality glass for use in the manufacture of products where high quality glass is essential.

One of the critical limiting factors in producing high quality glass is the difficulty encountered in reducing the size as well as the quantity of cords existing in molten glass. The cords appear as ambient bodies of different compositions and usually are of greater density and viscosity than the surrounding matrix and move slowly with currents of flow in the glass. Dissipation of the cords is at times difficult requiring prolonged heating at a high temperature and/or relatively violent stirring by mechanical means consuming large amounts of power, which adds considerably to the cost of producing the glass. The presence of such cords in the molten glass not only reduces the quality of the glass but, in addition, renders it difficult to process the glass in the manufacture of many kinds of products.

This is especially true in the manufacture of fine glass fibers or strands where very fine streams of glass are flowed from a body of molten glass contained within a bushing or feeder. The presence of cords, especially cords of substantial size, in the molten glass renders it difficult to maintain a uniform stream diameter and interferes with the proper continuous flow of the molten glass through the bushing orifices even though other conditions may be ideal.

Another object of this invention is to materially reduce the size of any cords present in the molten glass.

In accordance with this invention any cords existing in the molten glass are either dissipated entirely or are reduced in size to such an extent as to have negligible effect on the processing of the glass. This is accomplished generally by flowing the molten glass through a screen and by orienting any cords present in the molten glass in positions substantially parallel to the screen at the entrant or outer side of the latter so that the cords are drafted transversely of their length through the perforations in the screen. As a result the cords are broken up into numerous smaller cords of short lengths as they pass through the screen and a more homogeneous mixture is obtained.

When a screen is used alone to "strain" the glass flowing toward the discharge orifice any cords therein moving with the current of flow are presented to the screen in a haphazard manner, i. e., some are caused to pass through the screen in a direction parallel to their length so that the mass is divided into one or more cords of small diameter but of substantially continuous length. Cord masses reaching the screen as a broad surface may be broken up into a plurality of filaments which due to the flow of glass toward the orifice do not tend to disperse but rather flow together again into the proportional relation in which they left the screen.

Due to the viscous nature of the material making up the cords, the cords attenuate slowly and show a marked tendency to draw together into streams and recombine as they leave the screen openings. The flow constricting characteristics of the screen causes the level of the glass at the orifice to lie substantially below that of the main body so that the streams flow downwardly. As they do so, the thin streams attenuate lengthwise substantially individually from the screen openings so that intermixing is prevented. The use of a screen alone has the further limitation that the size of the screen openings in order to adequately break up the cords must be small and therefore a large screen surface area is required so that a practical volume of flow can be realized.

A further feature of this invention is to adjustably control the flow of the molten glass passing from the screen through a discharge orifice at a predetermined rate so that the glass flows in a regulated stream from the orifice.

The foregoing, as well as other objects of this invention, will be made more apparent as this description proceeds, especially when considered in connection with the accompanying drawings, wherein:

Figure 1 is a front elevational view of the apparatus constructed in accordance with this invention;

Figure 2 is a plan view of the construction shown in Figure 1;

Figure 3 is a vertical sectional view of the apparatus taken on the line 3—3 of Figure 1;

Figure 4 is a fragmentary sectional elevational view of a modified form of stirring mechanism;

Figure 6:
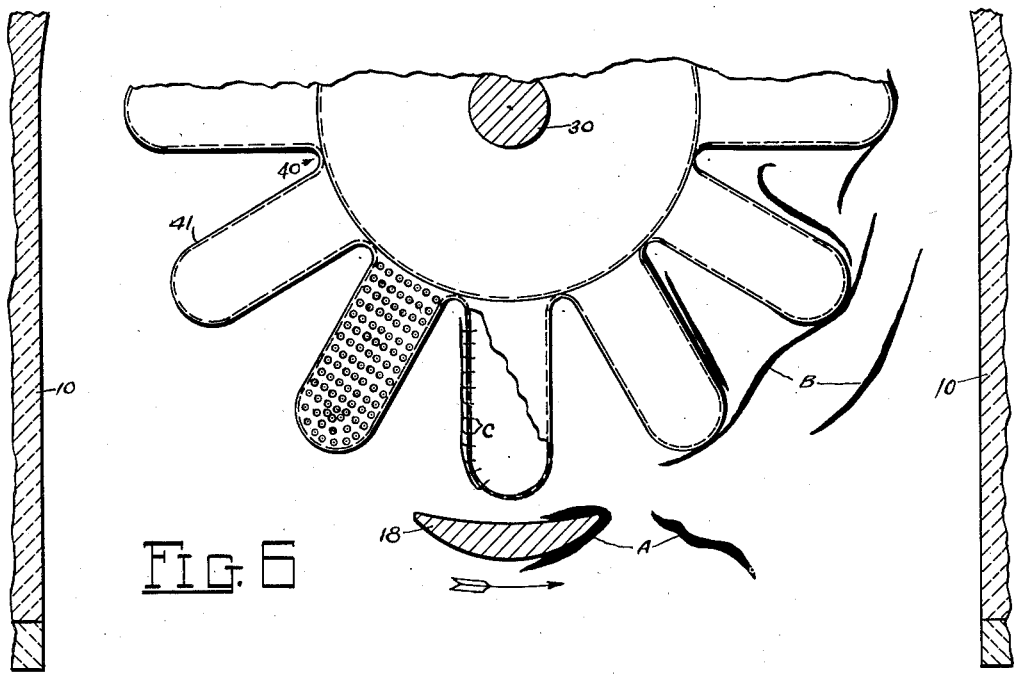
Figure 6 is a fragmentary sectional plan view showing a modified form of screen.

Upon reference to Figure 3 of the drawings, it will be noted that the reference character 10 designates a portion of a receptacle commonly known as a "boot" and the numeral 11 indicates the normal level of a supply of molten glass in the receptacle. The receptacle may be formed of a heat-resistant refractory material such as, for example, sillimanite and is provided in its bottom wall with a restricted discharge orifice 12. The discharge orifice extends substantially below the level of the bottom of the receptacle or boot so that the molten glass in the receptacle flows by gravity through the orifice 12.

The molten glass discharged through the orifice 12 is compelled to flow through a generally circular screen 13 supported on the bottom wall of the receptacle 10 within the latter and surrounding the discharge orifice 12. The screen 13 is formed of a suitable high heat-resistant material such, for example, as platinum or nickel and is provided with an annular reduced portion 15 at the top which projects above the normal level 11 of the molten glass in the receptacle 10 to prevent escape of molten glass into the screen through the top of the latter.

The size and number of the perforations 14 in the screen 13 are predetermined with respect to the viscosity of the molten glass at the flowing temperature and to provide a certain amount of mixing and the desired volume of flow of the molten glass through the screen. To achieve a more complete mixing of the glass than heretofore obtained, a stirrer 16 comprising a rotatable sleeve 17 is supported above the screen in coaxial relation to the latter and having diametrically opposed fingers 18 depending from the bottom of the sleeve. The fingers 18 are positioned exteriorly of the screen 13 in parallel relation to the axis of rotation of the sleeve and project downwardly into the receptacle 10 to a point substantially below the level 11 of the molten glass in the receptacle.

The fingers 18 rotate around the screen 13 as a unit with the sleeve 17 and impart a stirring action to the molten glass immediately adjacent the side wall of the screen 13. The stirring action of the fingers 18 induces a flow of molten glass around the screen and any cords existing in the molten glass are not only attenuated or strung-out but, in addition, are oriented to positions substantially parallel to the adjacent surface of the screen. Thus the normal flow of molten glass through the screen 13 is generally transverse of the thinned-out cords and the latter are, in effect, drawn through the screen at right angles to the length of the cords. As a result, the cords are broken into a multiplicity of separate extremely fine units which are so small as to be negligible insofar as affecting the quality of the glass mixture is concerned.

Upon reference to Figure 3 of the drawings it will be noted that the sleeve 17 is supported above the receptacle 10 in a bearing 19 fixedly attached to a rigid frame 20 and the upper end of the sleeve projects beyond the bearing 19. A ring gear 21 of the beveled type is secured to the upper end of the sleeve 17 above the bearing 19 and meshes with a beveled driving pinion 22. The pinion 22 is secured on one end of a shaft 23 which is journaled in bearings 24 on a U-shaped bracket 29 and a sprocket 25 is secured to the opposite end of the shaft 23. The sprocket 25 is operatively connected to a second sprocket 26 by a chain 27, and the sprocket 26 is driven by a vertical drive shaft 27ª through suitable bevel gearing 28. Thus, rotation of the vertical shaft effects a corresponding rotation of the sleeve 17 and fingers 18 projecting from the bottom of the sleeve. The fingers are rotated about the screen at a relatively slow rate in order to reduce the possibility of entrapping air in the glass which will appear later as seeds. Also, much movement of the glass along the refractory walls of the boot causes the refractory to wear away. This provides one source of cord formation as well as causing "stones" or dislodged pieces of refractory to float about in the molten glass.

The flow of molten glass through the discharge orifice 12 is controlled by a plunger 30 having a conical portion 31 at the bottom which acts as a valve to regulate the quantity of molten glass discharged through the orifice 12. The plunger 30 is of sufficient length to extend upwardly through the screen 13 and sleeve 17 to a position above the beveled ring gear 21. The upper end of the plunger 30 is suitably pivotally connected to the lower end of a link 32 having the upper end pivotally connected to the free end of an arm 33. The opposite end of the arm is formed with a hub 34 having a vertical threaded bore for attachment to the upper end of a vertical rod 35. The rod 35 is slidably supported in bearings 36 suitably fixed to adjacent frame structure and having the lower end engaged by an adjusting screw 37. The screw 37 is mounted on a bracket 38 also carried by the frame structure and is provided with a hand wheel 39 located for convenient manipulation.

The above arrangement is such that manipulation of the hand wheel 39 either raises or lowers the rod 35 and arm 33 depending upon the direction of rotation of the hand wheel. Raising of the arm affects a corresponding upward movement of the plunger 30 to increase the effective cross-sectional area of the discharge orifice 12 and enable a greater quantity of molten glass to escape therethrough. On the other hand lowering of the arm 33 by the adjusting screw 37 imparts a downward movement of the plunger 30 to decrease the effective cross-sectional area of the discharge orifice and reduce the quantity of molten glass flowing through the orifice. The glass flowing from the orifice may be collected in a suitable container which serves as the glass supply for a fiber forming process or the stream may flow directly into a forming machine for making glass marbles or other articles.

The embodiment of the invention shown in Figure 6 of the drawings differs from the form of the invention previously described in that the screen 40 is of irregular contour instead of cylindrical. In detail the screen 40 is actually corrugated in cross-section and comprises a series of outwardly extending radial projections or lobes 41. One advantage of this type of screen is that the projections 41 substantially increase the structural strength of the screen and, in addition, increase the area or capacity of the screen available for the flow of molten glass without actually increasing the over-all diameter of the screen. Another important feature attributable to the above type of screen is that it provides for more thoroughly mixing the molten glass as the latter passes through the screen to the discharge orifice 12.

The screen 40 may be used in conjunction with the stirrer 16 in the same manner as the screen 13, the stirrer cooperating with the screen 40 in substantially the same manner as it coacts with the screen 13. In other words, the stirrer 16 will operate to thin-out any cords existing in the molten glass and to orient the thinned-out cords so that the latter are drafted through the screen in a direction generally transverse of the length of the cords. This action insures breaking up the cords into a multiplicity of extremely fine particles and enables obtaining a homogeneous glass mixture.

Figure 5:
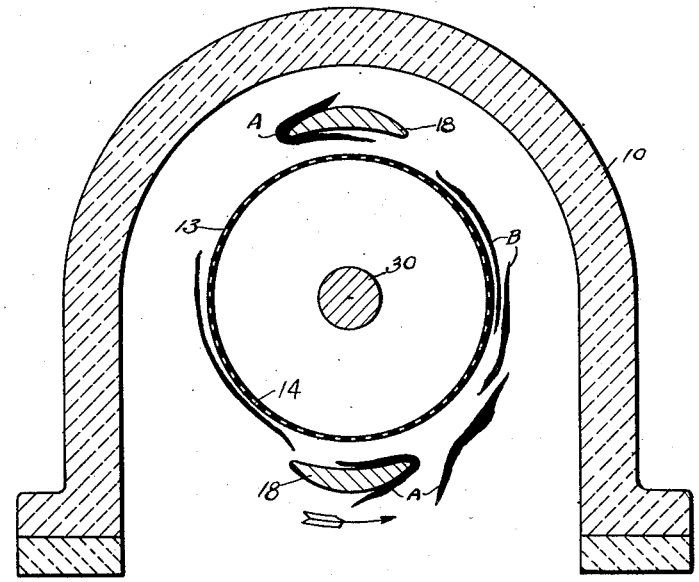
Figure 5 is a cross-sectional view taken substantially on the plane indicated by the line 5—5 of Figure 3.

In this connection it will be noted from Figures 5 and 6 of the drawings that cords suspended in the glass and indicated at A are engaged by the moving fingers 18 and drawn out into thin elongated bodies B which tend to orient themselves substantially parallel with the screen surface and move toward the screen with the flow of glass therethrough. Figure 6 illustrates in particular the manner in which the cords are broken into short lengths by the screen as at C. The close spacing of the screen perforations reduces the cords to such small diameter and length that they tend to further dissipate by diffusion and under the influence of movement of the glass.

The form of stirrer illustrated in Figure 4 is substantially similar in construction to the stirrer 16 shown in Figure 3 with the exception that a second depending finger 18ª is provided in spaced relation to the finger 18 for movement inside the screen 13a. In this instance the circular screen is open at the top and the perforated wall extends above the level of the glass.

The pair of fingers 18 and 18ª move together and disrupt the flow of glass on both sides of the screen, the finger 18ª inducing motion in the glass passing through the screen in a direction normal to the direction of flow toward the discharge orifice. This action exerts a pulling force on the glass passing through the screen orifices and tends to further attenuate any small cords remaining in the glass. As a result, the stirring inside the screen speeds up the mixing and delivery of the glass to the orifice.

Modifications may be resorted to within the spirit of the invention and the scope of the claims.

We claim:

1. The method of treating molten glass to increase the homogeneity of the glass mixture as it flows toward a discharge orifice which comprises stirring molten glass to arrange any cords existing therein substantially parallel to a perforated surface arranged in a substantially vertical plane, flowing the glass through said perforations in a multiplicity of streams, and combining said streams into a homogeneous body of molten glass.

2. The method of improving the homogeneity of molten glass which comprises flowing the glass from a source of supply toward a discharge orifice in a multiplicity of streams through a strainer and in a direction normal to the gravitational pull thereon, and positively moving the glass on both sides of said strainer by stirring in a direction normal to the path of flow of the glass therethrough.

3. The method of treating molten glass to increase the homogeneity of the glass mixture as it flows toward a discharge orifice comprising thinning out any cords in the molten glass by directing the flow of molten glass by stirring in a direction generally parallel to an upright strainer and adjacent thereto and reducing the size of the cords to a minimum by causing the molten glass to flow transversely of the strainer through the perforations in the latter.

4. Apparatus for mixing molten glass comprising a receptacle adapted to contain a supply of molten glass and having a discharge orifice at the bottom through which molten glass flows in the form of a stream, a screen corrugated in cross-section surrounding the discharge orifice requiring molten glass to pass therethrough as it flows to the discharge orifice, fingers positioned exteriorly of the screen for rotation about the axis of the screen, and means for rotating said fingers to induce the molten glass immediately adjacent the outer surface of the screen to flow along said surface prior to its passage through the screen.

5. Apparatus for mixing molten glass comprising a receptacle adapted to contain a supply of molten glass and having a discharge orifice through which molten glass flows, a circular screen positioned to require the molten glass to pass therethrough as it flows to the discharge orifice, pairs of fingers movable together adjacent the inner and outer sides of the screen, and means for moving said fingers about the axis of said screen to induce the flow of molten glass in a direction normal to the path of flow of the glass through the screen.

6. Apparatus for mixing molten glass comprising a receptacle adapted to contain a supply of molten glass and having a discharge orifice at the bottom through which molten glass flows to a point of distribution, a generally circular screen surrounding the discharge orifice compelling the molten glass to pass therethrough as it flows to the discharge orifice, fingers mounted for rotation about the axis of said screen positioned immediately adjacent the outer surface thereof, means for rotating said fingers to flow the glass along the surface of the screen prior to passing through the screen, and means for regulating the flow of molten glass through the orifice in the form of a stream.

7. The method of treating molten glass to increase the homogeneity of the glass as it flows toward a discharge opening which comprises flowing molten glass through a screen, stretching out any cords existing in the molten glass prior to passage of the molten glass through the perforations in the screen and at the same time orienting the cords to a position wherein they extend substantially parallel to the screen by stirring the molten glass at the entrant side of the screen.

RONALD B. WILEY.
ROBERT G. RUSSELL.

REFERENCES CITED

The following references are of record in the file of this patent:

UNITED STATES PATENTS

| Number | Name | Date |
|---|---|---|
| 771,557 | Locke | Oct. 4, 1904 |
| 1,117,666 | Hall | Nov. 17, 1914 |
| 1,612,658 | Soubier | Dec. 28, 1926 |
| 1,744,359 | Brown | Jan. 21, 1930 |
| 2,025,581 | Fechoz | Dec. 24, 1935 |
| 2,133,236 | Slayter et al. | Oct. 11, 1938 |
| 2,159,361 | Atkinson et al. | May 23, 1939 |
| 2,332,965 | Ducommum et al. | Oct. 26, 1943 |
| 2,335,135 | Staelin | Nov. 23, 1943 |

FOREIGN PATENTS

| Number | Country | Date |
|---|---|---|
| 272,441 | Germany | Apr. 1, 1914 |